US011851957B2

(12) United States Patent
Abou-Assaad et al.

(10) Patent No.: US 11,851,957 B2
(45) Date of Patent: Dec. 26, 2023

(54) SYSTEMS AND METHODS FOR SENSING ENGAGEMENT IN HAZARDOUS RATED ENVIRONMENTS

(71) Applicant: Hydril USA Distribution LLC, Houston, TX (US)

(72) Inventors: Amine Abou-Assaad, Houston, TX (US); Joseph Edison Huseman, Houston, TX (US); Juan Sanchez, Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 17 days.

(21) Appl. No.: 17/226,484

(22) Filed: Apr. 9, 2021

(65) Prior Publication Data

US 2022/0056771 A1 Feb. 24, 2022

Related U.S. Application Data

(63) Continuation of application No. 15/160,397, filed on May 20, 2016, now abandoned.

(60) Provisional application No. 62/165,600, filed on May 22, 2015.

(51) Int. Cl.
| | |
|---|---|
| E21B 19/16 | (2006.01) |
| E21B 47/00 | (2012.01) |
| E21B 17/01 | (2006.01) |
| E21B 19/00 | (2006.01) |
| G01D 5/20 | (2006.01) |
| E21B 33/038 | (2006.01) |

(52) U.S. Cl.
CPC ............ *E21B 19/165* (2013.01); *E21B 17/01* (2013.01); *E21B 19/002* (2013.01); *E21B 33/038* (2013.01); *G01D 5/20* (2013.01)

(58) Field of Classification Search
None
See application file for complete search history.

(56) References Cited

U.S. PATENT DOCUMENTS

| | | | | |
|---|---|---|---|---|
| 4,138,669 | A * | 2/1979 | Edison | H04Q 9/14 700/83 |
| 9,057,751 | B2 * | 6/2015 | Spencer | G01R 31/52 |
| 9,206,654 | B2 * | 12/2015 | DeBerry | E21B 19/165 |
| 9,404,322 | B2 * | 8/2016 | Wiedecke | E21B 19/165 |
| 2013/0148747 | A1 * | 6/2013 | Puchiano | H04L 25/026 375/257 |
| 2020/0109478 | A1 * | 4/2020 | Van Delden | B63B 59/08 |
| 2020/0318464 | A1 * | 10/2020 | Atchison | E21B 3/02 |

* cited by examiner

*Primary Examiner* — Matthew R Buck
*Assistant Examiner* — Douglas S Wood
(74) *Attorney, Agent, or Firm* — Osha Bergman Watanabe & Burton LLP (57) ABSTRACT

A riser sensor unit is used to sense engagement of a subsea riser tool with a riser coupling. The riser sensor unit includes a power supply configured to convert alternating current to direct current, an intrinsic safety barrier connected to the power supply, and a first sensor powered by the intrinsic safety barrier. The first sensor is attached to a sub of the subsea riser tool and is configured to generate a first signal upon detecting contact of a bottom surface of the sub with the riser coupling. The intrinsic safety barrier is configured to receive the first signal from the first sensor and transmit the first signal to a control system located remotely from the intrinsic safety barrier.

20 Claims, 6 Drawing Sheets

SYSTEMS AND METHODS FOR SENSING ENGAGEMENT IN HAZARDOUS RATED ENVIRONMENTS

CROSS REFERENCE TO RELATED APPLICATIONS

This is a continuation of U.S. patent application Ser. No. 15/160,397, titled "SYSTEMS AND METHODS FOR SENSING ENGAGEMENT IN HAZARDOUS RATED ENVIRONMENTS," filed May 20, 2016, which claims the benefit of priority to U.S. Patent Provisional Application No. 62/165,600, titled "Electric Method of Sensing Engagement in Hazardous Rated Environments," filed May 22, 2015, the entire content of which is incorporated herein by reference.

TECHNICAL FIELD

Example embodiments relate in general to sensing engagement in hazardous environments, and more particularly to systems and methods for sensing proper engagement of a riser tool with a riser coupling in drilling equipment in the oil and gas industry.

BACKGROUND

In drilling or production of an offshore well, a riser may extend between a vessel or platform and the wellhead. The riser may be as long as several thousand feet, and may be made up of successive riser sections. Riser sections with adjacent ends may be connected on board the vessel or platform, as the riser is lowered into position. Auxiliary lines, such as choke, kill, and/or boost lines, may extend along the side of the riser to connect with the wellhead, so that fluids may be circulated downwardly into the wellhead for various purposes. Connecting riser sections in end-to-end relation includes aligning axially and angularly two riser sections, including auxiliary lines, lowering a tubular member of an upper riser section onto a tubular member of a lower riser section, and locking the two tubular members to one another to hold them in end-to-end relation.

The riser section connecting process may require significant operator involvement that may expose the operator to risks of injury and fatigue. For example, the repetitive nature of the process over time may create a risk of repetitive motion injuries and increasing potential for human error. Therefore operators in the oilfield industry typically desire the ability to automate their drilling equipment, especially sensing of a proper engagement between two components.

SUMMARY

One example embodiment is a riser sensor unit for sensing engagement of a riser tool with a riser coupling. The riser sensor unit includes a first sensor attached to a sub of the riser tool, the first sensor configured to generate a first signal upon detecting contact with the riser coupling, and an intrinsic safety barrier configured to transmit the first signal to a control system.

Another example embodiment is a system for sensing engagement in a riser coupling, the system includes a riser tool configured to engage with the riser coupling, and a riser sensor unit includes a power supply unit for converting alternating current to direct current, an intrinsic safety barrier operatively coupled to the power supply unit, and a plurality of sensors powered by the power supply unit and configured to transmit signals to a control system.

Another example embodiment is a method for sensing engagement of a riser tool with a riser coupling. The method includes attaching a first sensor to the riser tool, the first sensor configured to generate a first signal upon sensing contact with the riser coupling, connecting the first sensor to an intrinsic safety barrier, and transmitting, by the intrinsic safety barrier, the first signal to a control system.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and therefore are not to be considered limiting of its scope as the invention may admit to other equally effective embodiments.

DETAILED DESCRIPTION

The systems and methods of the present disclosure will now be described more fully hereinafter with reference to the accompanying drawings in which embodiments are shown. The systems and methods of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Additionally, in the following description, it is understood that such terms as "inner," "outer," "upper," "lower," "top," "bottom," "first," "second," and the like are words of convenience and are not to be construed as limiting terms.

Figure 1A:
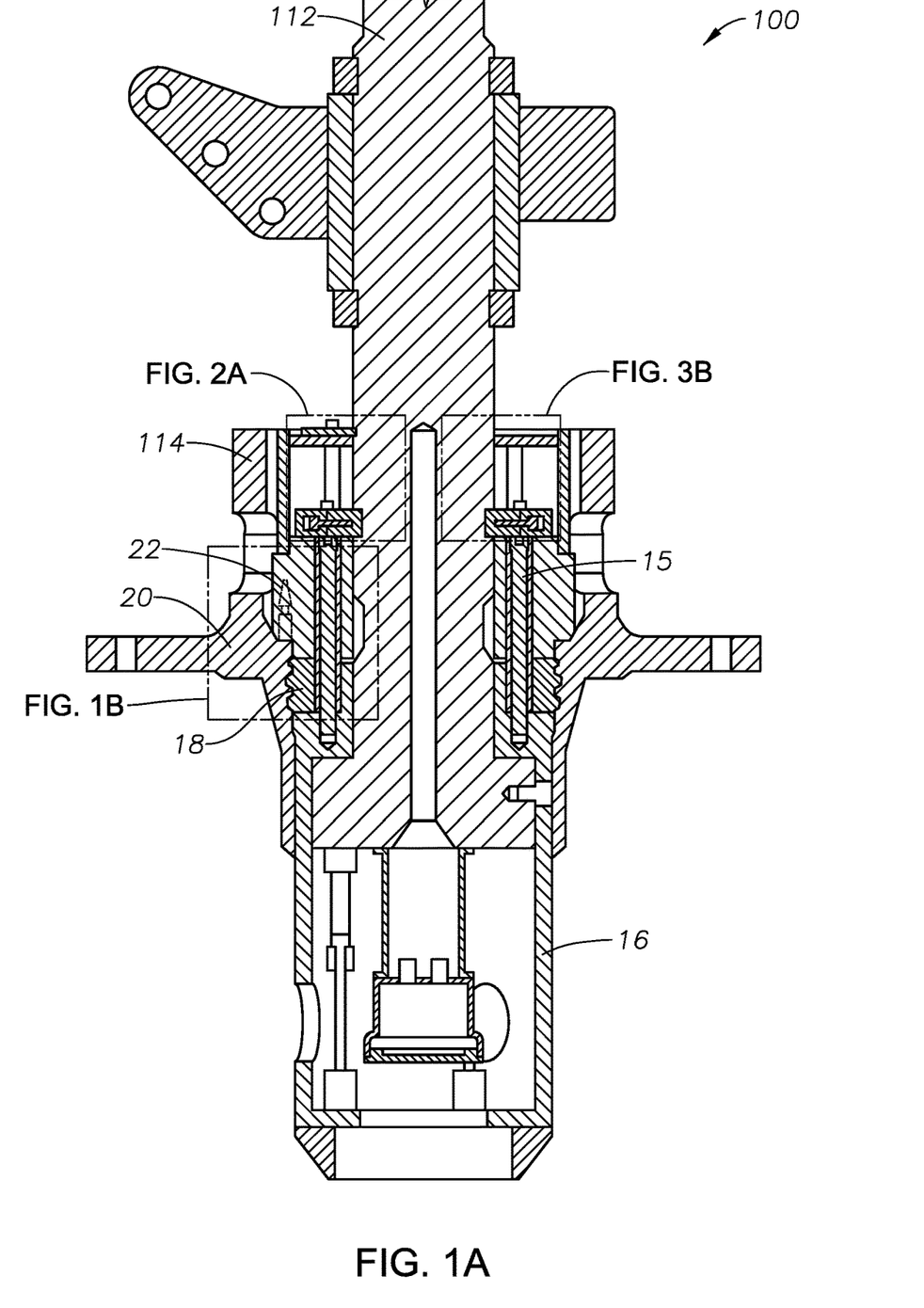
FIG. 1A illustrates a cross-sectional view of a riser sensor unit in a riser coupling, according to one or more example embodiments of the disclosure.

FIG. 1A shows one example of a tool that can be automated using technology of the present invention. Specifically, FIG. 1A illustrates a system 100 including an upper riser section or riser tool 112 that is configured to engage with a lower riser section 16. This may be accomplished using a riser coupling 114, which may have an annular ring 20 on an outer diameter thereof. The riser tool 112 may be engaged with the riser coupling 114 using several means such as locking dogs 18, which may be installed on an outer diameter of the tool 112, and which may engage with a corresponding tooth profile formed on an interior of the riser coupling 114. Another locking mechanism may include a mechanical lockdown system that may include a plate or lockdown member (not shown) that may be used to engage with tie rods 15. Multiple tie rods 15 may be installed along the perimeter of the lower section 16 and through the annular ring 20 to properly engage the riser tool 112 with the riser coupling 114.

Although a riser tool is illustrated and described in the example embodiments disclosed herein, the disclosure is not limited to such arrangements. For example, the example embodiments disclosed may be implemented in any oilfield equipment including but not limited a riser handling tool, a riser running tool, subsea running or handling tools, casing running or handling tools, and gimbals or spiders.

Figure 1B:
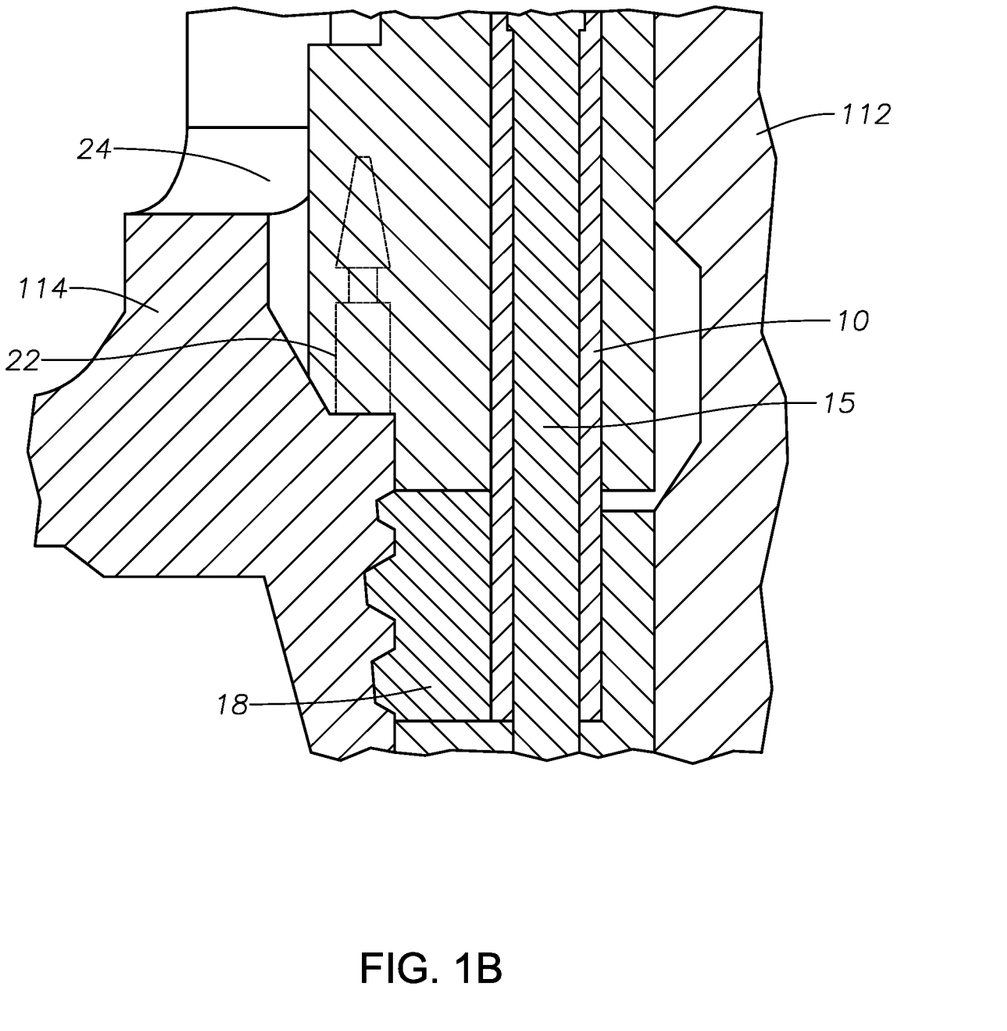
FIG. 1B illustrates a sectional perspective view of a riser sensor unit in a riser coupling, according to one or more example embodiments of the disclosure.

FIG. 1B illustrates a sectional perspective view of a riser sensor unit 22 in a riser tool 112, according to one or more example embodiments of the disclosure. Riser sensor unit 22 may be installed on a sub 24 of the riser tool 112 for sensing engagement of the riser tool 112 with the riser coupling 114. The riser sensor unit 22 may include proximity sensors, such as inductive sensors, that may be installed in the body of the sub 24 of the riser tool 112 such that a transducer in the sensor faces downwards towards a bottom surface of the sub 24. The proximity sensors may be configured to generate a positive or negative signal upon detecting contact with the riser coupling 114. The proximity sensors may be connected to an intrinsic safety barrier (not shown), which may be configured to transmit the signal from the proximity sensors to a control system, such as a distributed control system (DCS) or a master control system (MCS), to cause to extend hydraulics 10 upon receiving the signal from the proximity sensors. Hydraulics 10 may be employed to lock the tool 112 in place once the proximity sensors sense proper engagement with the riser coupling 114.

Figure 2A:
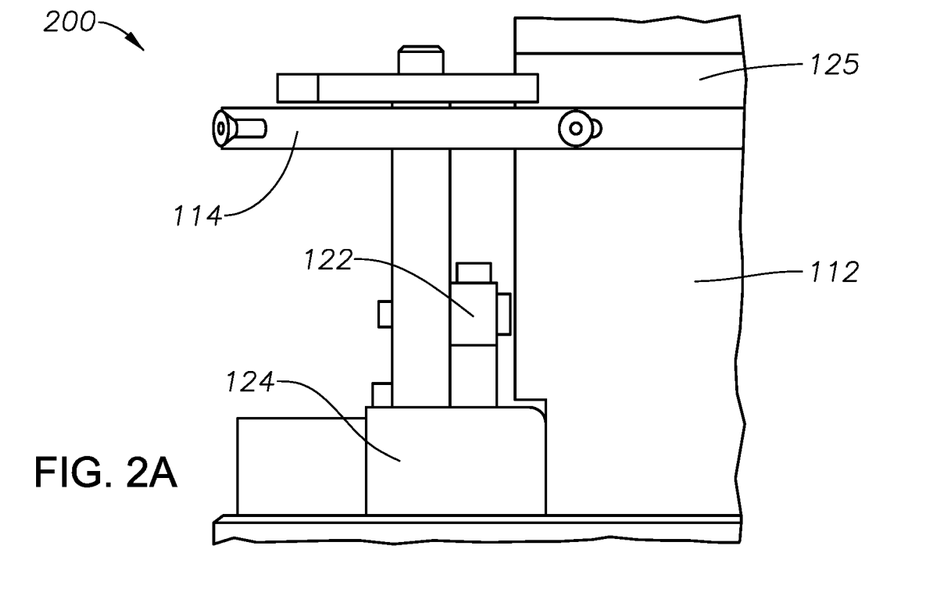
FIGS. 2A-2B illustrate sectional perspective views of a riser sensor unit in a riser coupling, according to one or more example embodiments of the disclosure.
Figure 2B:
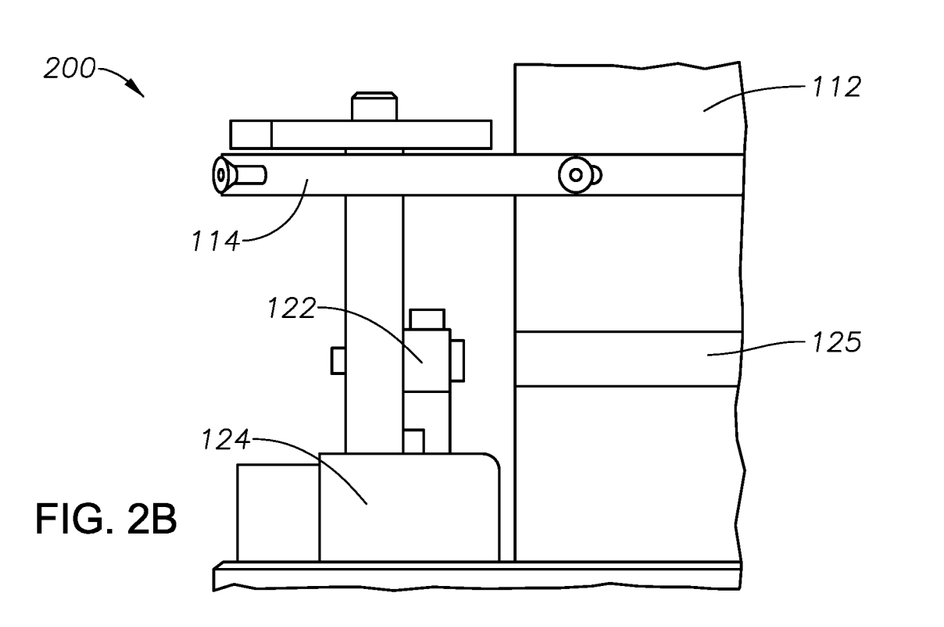

FIGS. 2A-2B illustrate sectional perspective views of a riser sensor unit 200 in a riser coupling, according to one or more example embodiments of the disclosure. Unit 200 may include proximity sensors 122, such as inductive sensors, that may be installed on a lockdown member 124, such as a lockdown plate, that may be used as a secondary lock to engage the riser tool 112 with the riser coupling 114. Proximity sensors 122 may be configured to generate a positive or a negative signal when the lockdown member 124 comes in contact with the tool 112. Alternatively or in addition, proximity sensors 122 may generate a positive or negative signal when the sensor is within a predetermined distance from the stem of the riser tool 112. Alternatively or in addition, sensors 122 may detect a marked region or recess 125 formed on the outer diameter of the stem of the riser tool 112, which may indicate that the secondary lock in unengaged, and if the marked region or recess 125 is not detected, then the sensors 122 may sense that the secondary lock is in an engaged position, or vice versa.

Figure 3A:
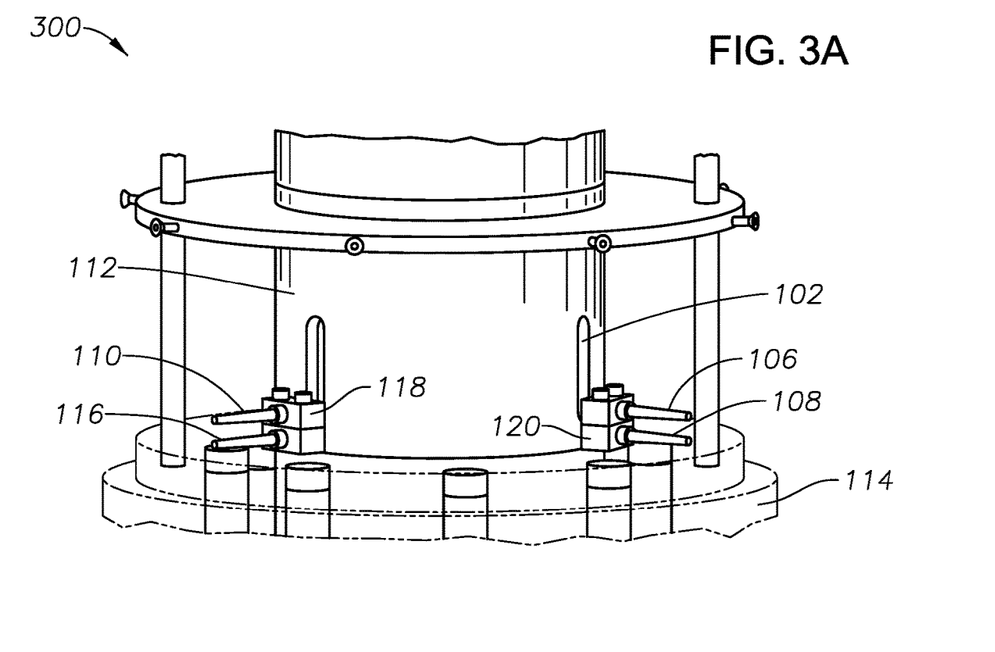
FIGS. 3A-3C illustrate sectional perspective views of a riser sensor unit in a riser coupling, according to one or more example embodiments of the disclosure.
Figure 3B:
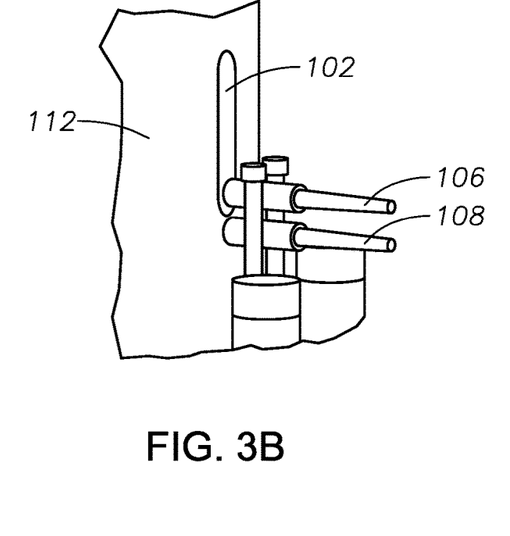
Figure 3C:
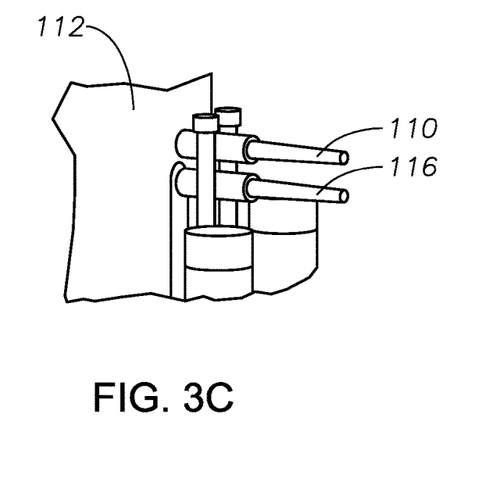

FIGS. 3A-3C illustrate a sectional perspective view of a riser sensor unit 300 in a riser coupling 114, according to one or more example embodiments of the disclosure. The riser sensor unit 300 may include a third set of sensors 106, 108 installed along an outer diameter of a stem of the riser tool 112, as illustrated in FIG. 3A, for example. Sensor 106 may be configured to generate a positive or negative signal upon detecting a marked region or recess 102 on the outer diameter of the stem, and determining the riser stem is in a lifted and locked position as illustrated in FIG. 3B, for example. The marked region or recess 102 may include a colored band or a vertical or horizontal slot that may be formed on the outer diameter of the stem 112. The third set of sensors 106, 108 may be mounted on a mounting bracket 120 and may be connected to the intrinsic safety barrier (not shown) such that the intrinsic safety barrier transmits the signal from these sensors 106, 108 to a control system, such as a DCS or an MCS. The control system may cause to lift the riser tool 112 or riser coupling 114 upon determining the riser stem is in a lifted and locked position.

In another example embodiment, the riser sensor unit 300 may include a fourth set of sensors 110, 116 installed along the outer diameter of the stem of the riser tool 112. Sensors 110 may be configured to generate a positive or negative signal upon detecting a non-marked region on the outer diameter of the stem, and determining the riser tool is in an unlocked position, such as that illustrated in FIG. 3C, for example. The fourth set of sensors 110, 116 may be mounted on a mounting bracket 118 and may be connected to the intrinsic safety barrier such that the intrinsic safety barrier transmits the signal from these sensors to the control system to cause to retrieve the riser tool 112 from the riser coupling 114 when it is determined that the riser tool 112 is in an unlocked position. In some embodiments, the fourth set of sensors can be redundant, creating added safety, and reliability of system 300. Any of the first, second, third, and fourth set of sensors may include a proximity sensor such as an inductive sensor or a capacitive sensor.

Figure 4:
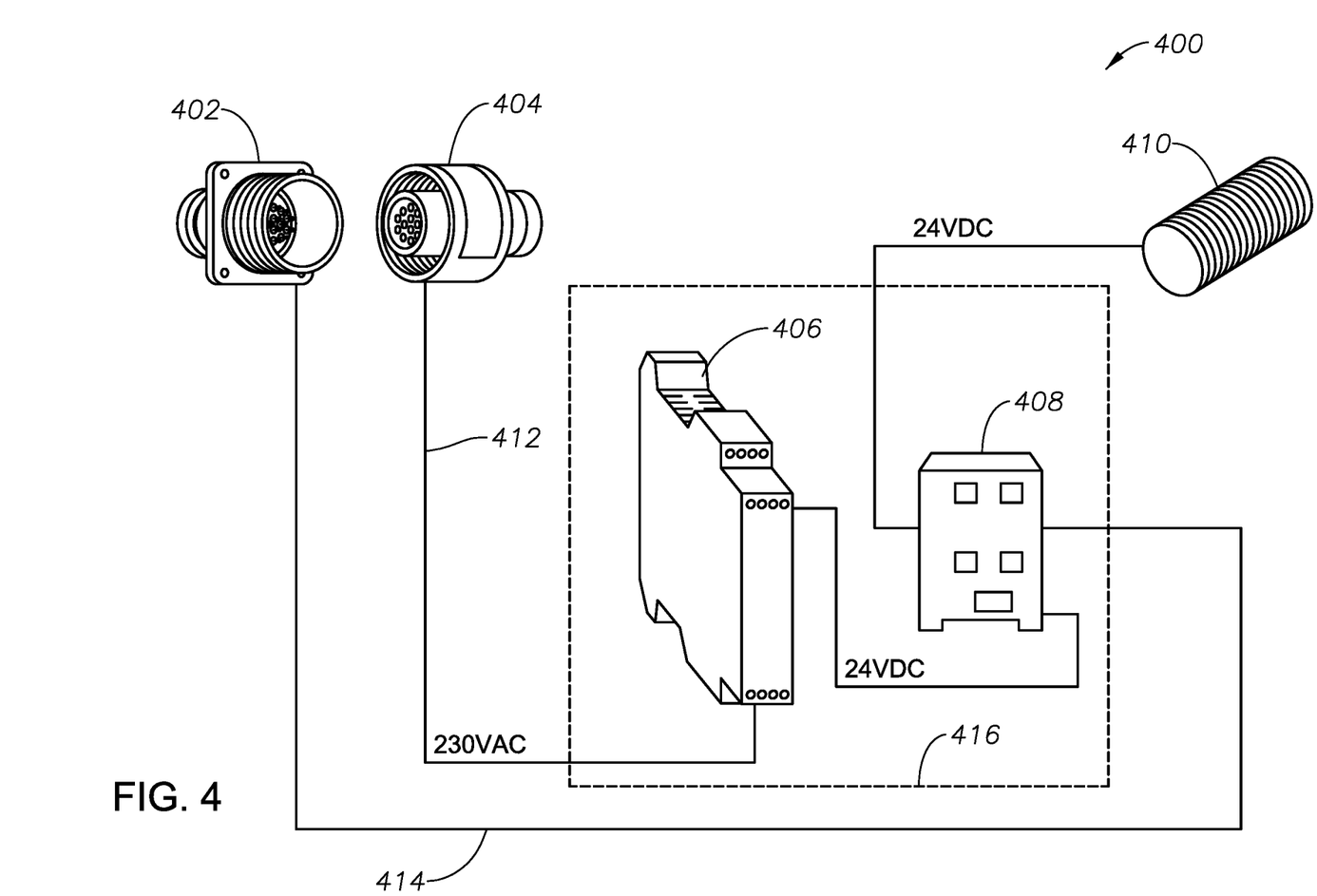
FIG. 4 is an illustrative schematic of a system, according to one or more example embodiments of the disclosure.

FIG. 4 is an illustrative schematic of a system, according to one or more example embodiments of the disclosure. The system may include a riser tool configured to engage with the riser coupling, as discussed in any of the above example embodiments, and a riser sensor unit 400 as illustrated in FIG. 4. The riser sensor unit 400 may include a power supply unit 406 configured to receive 230 volts of alternating current (VAC) power from a first Zone 1 rated pin connector 404. The power supply unit 406 is configured to convert the 230 VAC power to 24 volts of direct current (VDC) power, and supply the 24 VDC power to an intrinsic safety (IS) barrier 408. The IS barrier 408 is configured to supply the 24 VDC power to a plurality of sensors 410, which may include sensors 22, 122, 106, 108, 110, 116 from the above example embodiments, and transmit signals from the plurality of sensors to a second Zone 1 rate pin connector 402. The second Zone 1 rated pin connector 402 can be connected to a distributed or master control system, which may include a customer interface.

Figure 5:
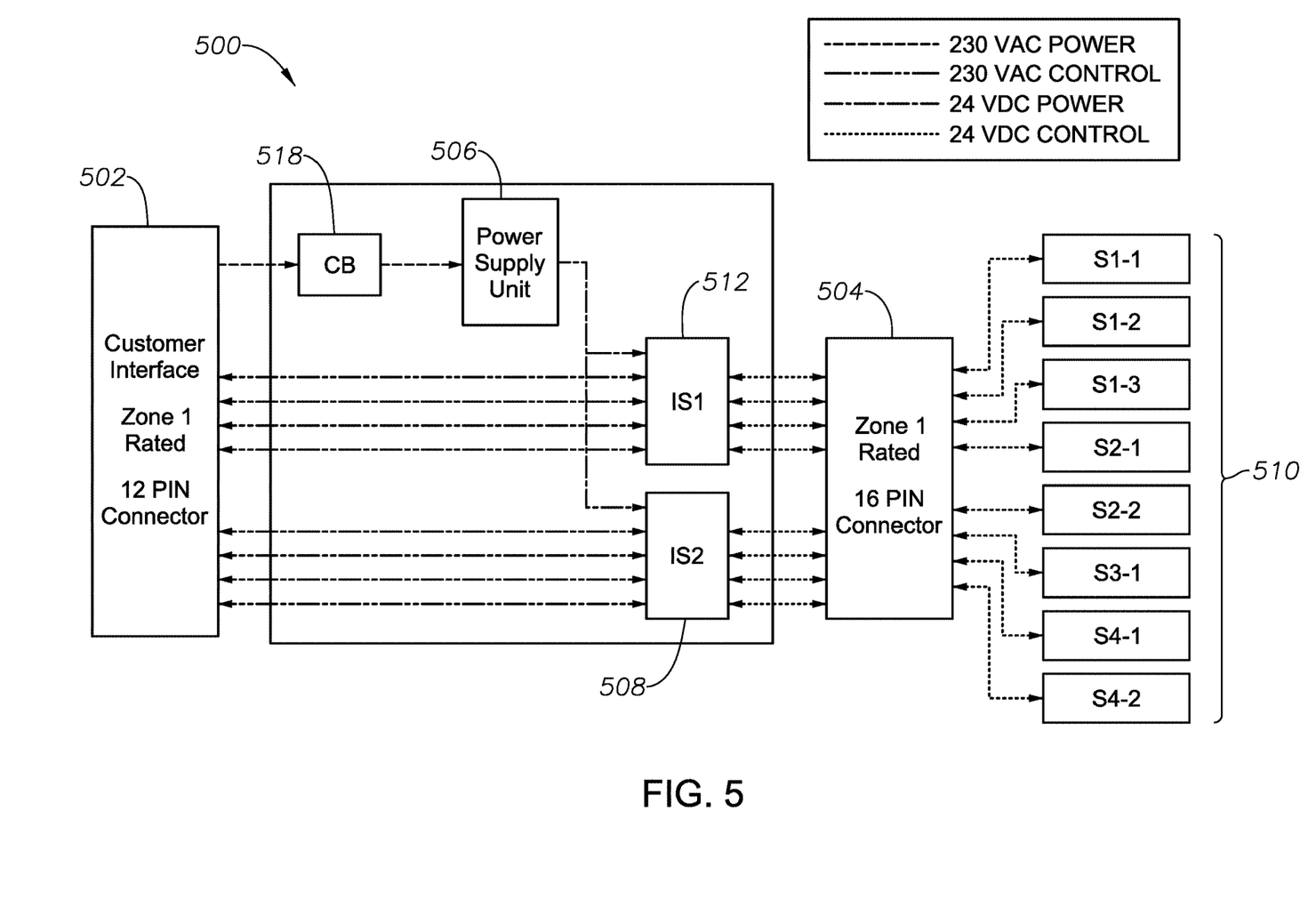
FIG. 5 is an illustrative schematic of a system, according to one or more example embodiments of the disclosure.

FIG. 5 is a further illustrative schematic of a system, according to one or more example embodiments of the disclosure. The system may include a riser tool configured to engage with the riser coupling, as discussed in any of the above example embodiments, and a riser sensor unit 500 as illustrated in FIG. 5. The riser sensor unit 500 may include a power supply unit 506 configured to receive 230 VAC power from a first Zone 1 rated pin connector 502. The power supply unit 506 is configured to convert the 230 VAC power to a 24 VDC power, and supply the 24 VDC power to two or more IS barriers 512. A circuit breaker 518 may optionally be used for protection on the input side of the 230 VAC to 24 VDC power supplies. The IS barriers 512 may be configured to supply the 24 VDC power to a plurality of sensors 510 via a second Zone 1 rate pin connector 504. Sensors 510 may include any of the sensors 22, 122, 106, 108, 110, 116 from the above example embodiments. The IS barriers 512 may be configured to transmit signals from the plurality of sensors 510 to Zone 1 rated pin connector 502. The Zone 1 rated pin connector 502 can be connected to a distributed or master control system, which may include a customer interface for further operation.

One example embodiment of the present disclosure is a method for sensing engagement of a riser tool with a riser coupling. The method may include installing a first set of sensors in a sub of the riser coupling. The first set of sensors may be configured to generate a positive or a negative signal upon sensing contact by the tool, indicating a proper engagement of the riser tool by the riser coupling. The first set of sensors may be connected to an IS barrier, which may receive the signal from the sensors and transmit them to a control system. The control system may cause to extend hydraulics upon receiving the signal.

The method may also include installing one or more sensors on a lockdown member to sense a secondary locking engagement with the riser tool. The one or more sensors may be configured to generate a positive or a negative signal upon detecting the lockdown member is in contact with the tool, thereby indicating the riser tool is properly engaged with the riser coupling.

The method may also include installing a third set of sensors along an outer diameter of a stem of the riser tool. The third set of sensors may be configured to generate a positive or negative signal upon detecting a marked region or recess on the outer diameter of the stem, and determining the riser stem is in a lifted and locked position. The marked region can include a colored band or recess on the outer diameter of the stem of the riser tool or other means such as a vertical or horizontal slot formed on the outer diameter of the stem of the riser tool. The third set of sensors may be connected to the IS barrier for transmitting the signals to the control system. The control system may cause to lift the riser tool or riser coupling upon receiving the signal and determining the riser stem is in a lifted and locked position.

The method may also include installing a fourth set of sensors along the outer diameter of the stem of the riser tool. The fourth set of sensors may be configured to generate a positive or negative signal upon detecting a non-marked region on the outer diameter of the stem, thereby determining the riser tool is in an unlocked position. For example, these sensors may generate a positive or negative signal when the outer diameter of the stem of the riser tool is sensed without the colored band or the slots. The fourth set of sensors may also be connected to the IS barrier so as transmit the signal from these sensors to the control system to cause to retrieve the riser tool from the riser coupling, when it is determined that riser tool is in an unlocked position.

In certain embodiments, the invention can include electrical components that are zone rated for hazardous environments in an EXD enclosure. The area inside the enclosure can be very small, and sensing the traditional method with a programmable logic controller (PLC) would not fit in such an enclosure. As shown in FIGS. 4 and 5, the present technology can allow for a 230 VAC signal to travel great distances, be converted to a 24 VDC current for the sensors, and then the IS barrier is capable of sending the positive (or negative) signal back to the operator without the use of a PLC inside the enclosure. This allows sensing in smaller areas than the traditional method. In addition, because the signal may be based from an electrical signal, the speed from the automation can be much faster than hydraulic or mechanical sensors. The proximity sensors can also be placed so that installation, maintenance, and replacement can be achieved with minimal intervention. It is to be understood that the specific numbers used herein and shown in the drawings are for illustrative purposes only.

In one example embodiment, the riser sensor system may include at least eight (8) sensors, that may be located in the sub. There may be three sensors to sense proper positioning of the coupling and the riser tool, and two sensors to sense the stem is in the lifted and locked position. One sensor may sense secondary lock engaged and two sensors sense the stem descend to an unlocked position. The riser sensor unit can be designed to operate with 50/60 Hz frequency, for example. The riser sensor unit panel can provide 24 VDC control power for the sensors and the IS barriers, and the power supply may have a transient surge protection with input fuse of 1.25 A. The output currents can be a minimum of 1.3 A, for example. The operating temperatures, however, can be anywhere in the range of −25 degrees C. to +60 degrees C. The riser sensor unit may optionally use a VAC circuit breaker for protection on the input side of the 230 VAC to 24 VDC power supplies. The riser sensor unit can also include a plurality of redundant sensors, which may be used to sense the correct position between the coupling and the riser tool before the locking dogs of the riser tool engage into their corresponding tooth profile inside the coupling.

The sensors used may be rated for industrial use, such as for machine or plant engineering, process equipment, mobile equipment, material handling, or packaging industry. All of the above example embodiments may be implemented using proximity sensors, including but not limited to inductive, capacitive, Doppler effect, Eddy-current type, laser rangefinder, magnetic, passive optical, passive thermal, photocell, radar, sonar, ultrasonic, fiber optic, hall effect sensors, and electromechanical switches. The control system is designed in a way that under any circumstances it will not reduce the operational availability of the BOP control system. The riser sensor unit can be physically and functionally interchangeable without need for modification of the items or the equipment. The sensor redundancy allows for continued automation in case of sensor failure. IS barriers can in some embodiments combine the energy limiting features of a zener barrier with galvanic isolation.

The above example embodiments provide for electrical sensing of lock mechanisms that enable the riser tool to transmit electrical signals to a master control system (MCS) or distributed control system (DCS). The system uses zone rated harsh environment sensors and enclosures that allow the riser tool to be installed and operated in Zone 1 rated areas. These systems are designed for an extremely limited installation area that is subject to high vibration and shock. For example, the embodiments of the present technology can fit into explosion proof hazardous rated enclosures as small as 7.7 inch by 7.7 inch by 6.7 inch while utilizing proximity sensors to sense engagements in confined areas.

The above example embodiments also provide electrical solution to a common hydraulically actuated and sensed system. These example embodiments offer the opportunity to establish electrical sensing in handling, running, or other oilfield equipment. One advantage of the example systems and methods disclosed is that there is less down-time on the rig. Another advantage is that the systems can be used to automate the process that generally requires constant human intervention. The system also provides added safety by detecting proper tool engagement.

Systems 100-500 can be employed in a drilling riser in order to support a riser string and blow out preventer (BOP) from a drillship or platform until it can be connected to the wellhead connector on the surface of the sea. In another embodiment, systems 100-500 can be employed in a well access system, connecting the top tensioned riser to the subsea wellhead. Such a well access system may include hydraulic cylinder, and may be utilized, for example, by a direct vertical access (DVA) system, a completion workover riser (CWOR) system, a riserless light well intervention (RLWI) system, a spider, or the like. Although a riser tool is illustrated and described in the above example embodiments, the disclosure is not limited to such arrangements. For example, the above example embodiments may be implemented in any oilfield equipment including but not limited a riser handling tool, a riser running tool, subsea running or handling tools, casing running or handling tools, and gimbal or spiders. A riser handling tool, for example, lifts or handles a riser to the drill floor and then a riser running tool may hold the entire load of the riser string, and lower the string by adding one riser at a time. Accordingly, a riser handling tool hands the component and the riser running tool handles the entire string, adding one component at a time until the string has "run" all the way to the bottom.

In yet another embodiment, systems 100-500 can be employed in a wellhead connection, such as a connection associated with a stress joint of a connector assembly that engages in the upper rim of the wellhead housing. Systems 100-500 can also be employed, for example, in jack-up rigs, spars, drillships, dynamically positioned floating drilling systems, and moored floating drilling systems. A running tool that implements systems 100-500 may alternatively be employed in a drill string, for example, a tool joint, a drill collar, a telescoping joint, a riser joint, a riser joint with buoyancy, a fill-up valve, or a termination spool.

In yet another embodiment, systems 100-500 can be utilized in applications other than in oilfield tools, including but not limited to, construction equipment, manufacturing machinery, excavators, machine linkages, and wheel bulldozers. Systems 100-500 may be used in a hydraulic actuator application, including but not limited to, an aerial work platform, a crane, an earth moving machine, a wind mill, and in solar tracking equipment.

The devices and methods described herein, therefore, are well adapted to carry out the objects and attain the ends and advantages mentioned, as well as others inherent therein. While example embodiments of the devices and methods have been given for purposes of disclosure, numerous changes exist in the details of procedures for accomplishing the desired results. These and other similar modifications will readily suggest themselves to those skilled in the art, and are intended to be encompassed within the spirit of the devices and methods disclosed herein and the scope of the appended claims.

The invention claimed is:

1. A riser sensor unit for sensing engagement of a subsea riser tool with a riser coupling, the riser sensor unit comprising:
a power supply configured to convert alternating current to direct current;
an intrinsic safety barrier connected to the power supply, wherein the intrinsic safety barrier is a Zener barrier; and
a first sensor powered by the intrinsic safety barrier,
wherein the riser sensor unit, including the power supply, the intrinsic safety barrier, and the first sensor, is installed on the subsea riser tool,
wherein the first sensor is attached to a sub of the subsea riser tool, the first sensor configured to generate a first signal upon detecting contact of a bottom surface of the sub with the riser coupling, and
wherein the intrinsic safety barrier is configured to receive the first signal from the first sensor and transmit the first signal to a control system located remotely from the intrinsic safety barrier.

2. A riser sensor unit of claim 1, wherein the intrinsic safety barrier is located inside an explosion proof enclosure.

3. The riser sensor unit of claim 2, wherein the power supply is also located inside the explosion proof enclosure.

4. The riser sensor unit of claim 1, wherein the first sensor is a proximity sensor comprising a transducer, wherein the first sensor is positioned within the sub such that the transducer faces the bottom surface of the sub.

5. The riser sensor unit of claim 1, further comprising:
a lockdown member attached to the riser coupling; and
a second sensor attached to the lockdown member,
wherein the second sensor is a proximity sensor configured to generate a second signal upon detecting engagement between the lockdown member and the subsea riser tool;
wherein the second sensor is powered by the intrinsic safety barrier; and
wherein the intrinsic safety barrier is configured to receive the second signal and transmit the second signal to the control system.

6. The riser sensor unit of claim 1, further comprising:
a third sensor installed along an outer diameter of a stem of the subsea riser tool, the third sensor configured to generate a third signal upon detecting a first region on the outer diameter of the stem of the subsea riser tool,
wherein the third sensor is connected to the intrinsic safety barrier,
wherein the third sensor is powered by the intrinsic safety barrier, and
wherein the intrinsic safety barrier is configured to receive the third signal and transmit the third signal to the control system.

7. The riser sensor unit of claim 6, further comprising a fourth sensor installed along the outer diameter of the stem of the subsea riser tool, the fourth sensor configured to generate a fourth signal upon detecting a second region on the outer diameter of the stem of the subsea riser tool, wherein the fourth sensor is powered by the intrinsic safety barrier, and wherein the intrinsic safety barrier is configured to receive the fourth signal and transmit the fourth signal to the control system.

8. The riser sensor unit of claim 1, wherein the subsea riser tool is selected from the group consisting of a riser handling tool, a riser running tool, a subsea running tool, a casing running tool, and a gimbal.

9. A system for sensing engagement in a riser coupling, the system comprising:
a subsea riser tool configured to engage the riser coupling;
a riser sensor unit installed on the subsea riser tool, the riser sensor unit comprising:
a plurality of sensors connected to the subsea riser tool;
a power supply unit configured to convert alternating current to direct current;
an intrinsic safety barrier connected to the power supply unit and the plurality of sensors;
wherein the intrinsic safety barrier is powered by the direct current from the power supply,
wherein the plurality of sensors is powered by the intrinsic safety barrier, and
wherein the plurality of sensors is configured to transmit signals via the intrinsic safety barrier to a control system located remotely from the intrinsic safety barrier.

10. The system of claim 9, wherein the intrinsic safety barrier is a Zener barrier.

11. The system of claim 9, wherein the plurality of sensors comprises inductive sensors.

12. The system of claim 9, wherein the plurality of sensors are attached to different components of the subsea riser tool.

13. The system of claim 9, wherein the subsea riser tool is selected from the group consisting of a riser handling tool, a riser running tool, a subsea running tool, a casing running tool, and a gimbal.

14. The system of claim 9, wherein the intrinsic safety barrier is located inside an explosion proof enclosure.

15. The system of claim 14, wherein the power supply unit is also located inside the explosion proof enclosure.

16. A method for sensing engagement of a subsea riser tool with a riser coupling, the method comprising:
   sending alternating current to a power supply unit in a riser sensor unit, wherein the riser sensor unit is installed on the subsea riser tool;
   converting the alternating current to direct current in the power supply unit;
   sending the direct current to an intrinsic safety barrier in the riser sensor unit;
   sending the direct current from the intrinsic safety barrier to power a first sensor of the riser sensor unit, wherein the first sensor is installed in the subsea riser tool in a direction facing the riser coupling when the subsea riser tool engages the riser coupling;
   transmitting a first signal from the first sensor to the intrinsic safety barrier; and
   transmitting the first signal from the intrinsic safety barrier to a remote control system without using a programmable logic controller.

17. The method of claim 16, wherein the intrinsic safety barrier is located inside an explosion proof enclosure.

18. The method of claim 16, wherein the power supply unit is also located inside the explosion proof enclosure.

19. The method of claim 16, further comprising:
   sending the direct current from the intrinsic safety barrier to at least one additional sensor of the riser sensor unit located along the subsea riser tool;
   transmitting an additional signal from the additional sensor to the intrinsic safety barrier; and
   transmitting the additional signal from the intrinsic safety barrier to the remote control system.

20. The method of claim 16, wherein the intrinsic safety barrier is a Zener barrier.

\* \* \* \* \*